(12) United States Patent
Rastogi et al.

(10) Patent No.: US 9,467,845 B1
(45) Date of Patent: Oct. 11, 2016

(54) CELLULAR SYSTEM INFORMATION SHARING

(71) Applicant: Amazon Technologies, Inc., Reno, NV (US)

(72) Inventors: Nupur Rastogi, Cupertino, CA (US); Abinash Mahapatra, Cupertino, CA (US); Sanjeev Gupta, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 4 days.

(21) Appl. No.: 14/576,575

(22) Filed: Dec. 19, 2014

(51) Int. Cl.
*H04W 4/00* (2009.01)
*H04W 8/14* (2009.01)
*H04W 76/02* (2009.01)

(52) U.S. Cl.
CPC .............. *H04W 8/14* (2013.01); *H04W 4/008* (2013.01); *H04W 76/023* (2013.01)

(58) Field of Classification Search
CPC .... H04W 8/14; H04W 4/008; H04W 76/023
USPC ........................................................ 455/434
See application file for complete search history.

(56) References Cited

U.S. PATENT DOCUMENTS

| 9,119,051 | B2* | 8/2015 | Christopher | .......... H04W 12/04 |
| 2013/0316681 | A1* | 11/2013 | Huang | .................... H04W 4/24 |
| | | | | 455/414.1 |
| 2015/0249937 | A1* | 9/2015 | Lindoff | ............... H04W 76/023 |
| | | | | 370/331 |

* cited by examiner

*Primary Examiner* — Amancio Gonzalez
(74) *Attorney, Agent, or Firm* — Seyfarth Shaw LLP; Ilan N. Barzilay

(57) ABSTRACT

Approaches enable a device, such as a cellular-enabled device, to receive cellular system information from another device in response to a request by the cellular-enabled device, and then to select a cellular network connection to which the cellular-enabled device can connect based on the cellular system information. The cellular-enabled device may determine the availability of the cellular system information in a number of ways, such as by detecting a Bluetooth broadcast from another device and initiating a paired connection between the two devices. Once the paired connection is established, the cellular-enabled device may make a service discovery request to learn that the other device is capable of broadcasting the cellular system information over the connection between the devices. The cellular system information may be used by the cellular-enabled device to select one cellular network connection, from a set of available cellular network connections compatible with the cellular-enabled device, to connect to.

20 Claims, 6 Drawing Sheets

CELLULAR SYSTEM INFORMATION SHARING

BACKGROUND

People are increasingly interacting with computers and other electronic devices in new and interesting ways. For example, mobile devices are increasingly supporting multiple wireless technologies (e.g., LTE, WCDMA, GSM, CDMA, etc.) and frequency bands. In order to communicate over a cellular network, the device selects a cellular network provider from which to gain telecommunication service. Once a cellular network provider is selected, the device then selects a frequency band to use for cellular communications. Often times, however, in scenarios such as when the device is powered on, exiting airplane mode, or coming out of an area with no available cellular connections, the device typically scans all available cellular network connections and all frequency bands in the vicinity of the device in order to select the best possible connection over which to begin transmitting, which can cause battery drain and delays in acquiring service.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches for cellular network selection procedures for an electronic device. In particular, various embodiments enable a service such as a cellular network system information sharing service of a computing device (e.g., a mobile phone, tablet computer, etc.) or other electronic device to optimize selecting a cellular network connection in a wireless communication system.

Various approaches discussed herein enable a device, such as a cellular-enabled device, to receive cellular system information from another device in response to a request by the cellular-enabled device, and then to select a cellular network connection to which the cellular-enabled device can connect based on the cellular system information. The cellular-enabled device may determine the availability of the cellular system information in a number of ways, such as by detecting a Bluetooth broadcast from another device and initiating a paired connection between the two devices. Once the paired connection is established, the cellular-enabled device may make a service discovery request to learn that the other device is capable of broadcasting the cellular system information over the connection between the devices. The connection can include Bluetooth, Wi-Fi, Near Field Communications (NFC), infrared (IR), and Ultra Wideband, among others. The cellular system information can be used by the cellular-enabled device to select one cellular network connection, from a set of available cellular network connections compatible with the cellular-enabled device, to connect to.

Accordingly, approaches in accordance with various embodiments improve the operation and performance of the computing device on which they are implemented by, among other advantages, minimizing delay in acquiring cellular service and improving battery life by reducing an amount of processing to acquire a cellular network connection. Various other applications, processes, and uses are presented below with respect to the various embodiments.

Figure 1:
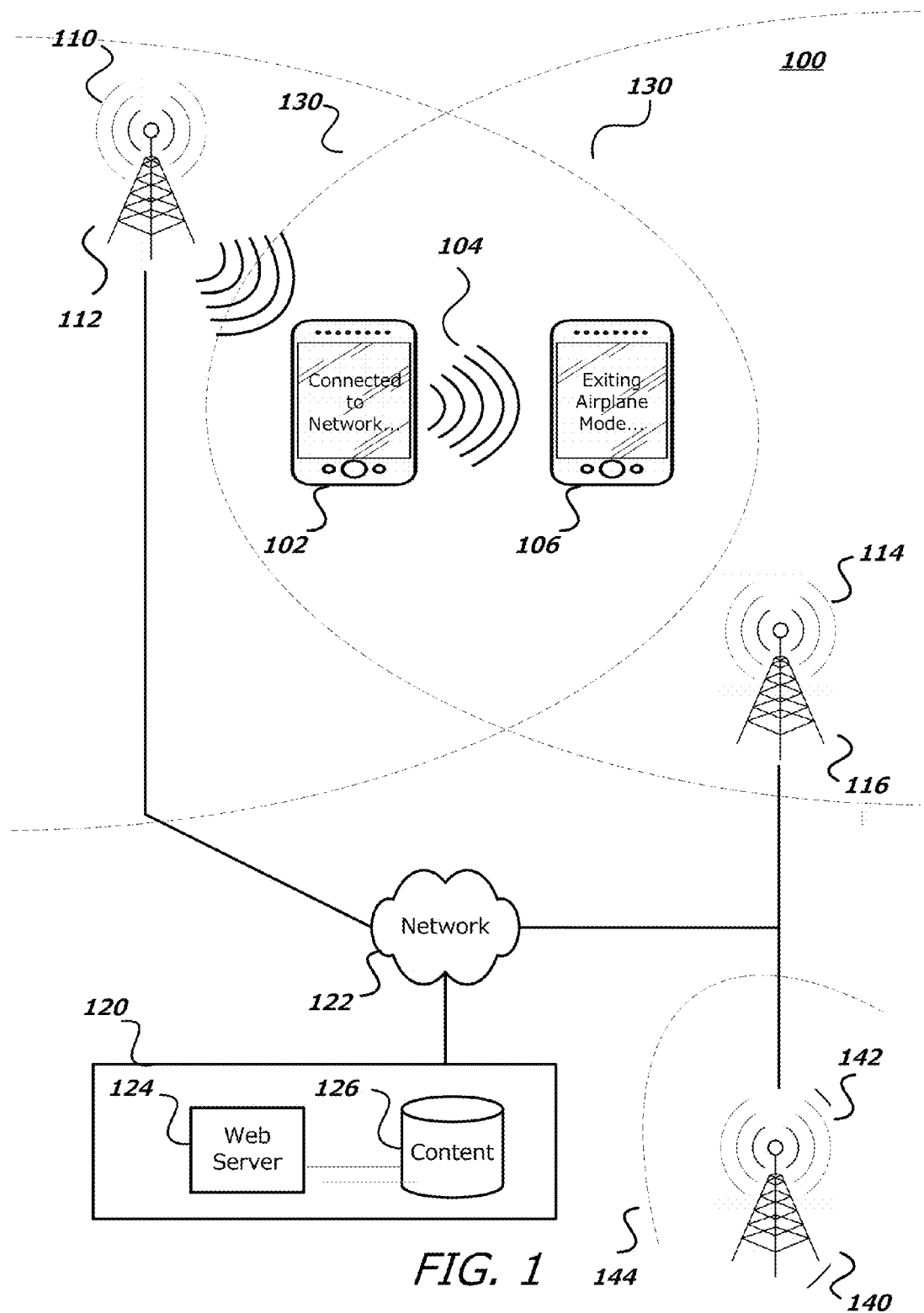
FIG. 1 illustrates an example of a computing device transmitting cellular system information, over a peer-to-peer connection with another computing device, that is used by the other device in selecting and connecting to an available cellular network, in accordance with various embodiments.

FIG. 1 illustrates an example of a computing device 102 transmitting 104 cellular system information, over a peer-to-peer connection with another computing device 106, which is used by the other device 106 in selecting and connecting to an available cellular network, in accordance with various embodiments. While the devices in this example are portable computing devices, such as smart phones, tablet computers, or personal data assistants, it should be understood that any appropriate computing or electronic device can take advantage of aspects of the various embodiments, as may include personal computers, set top boxes, smart televisions, video game systems, or any device capable of cellular data transmission. As illustrated in situation 100 in FIG. 1, the connected device 102 is powered on and connected to a cellular network 110 transmitted by a cellular access tower 112.

A cellular network connection (110, 114) provides access to at least one network (e.g., a global system for mobile communication (GSM), a long term evolution (LTE), universal mobile telecommunications system (UMTS), among others) using one or more cellular access towers (112, 116) to which the device connects for access to telecommunication services (such as data and/or voice communications) provided by a networked environment 120. For example, as shown in FIG. 1, cellular network connections 110 and 114 provide access to the networked environment over an appropriate network 122, where in this example, the environment includes a Web server 124 for receiving requests and serving content in response thereto, although for other networks, an alternative device serving a similar purpose could be used, as would be apparent to one of ordinary skill in the art. Access to the networked environment can allow a user to perform tasks such as obtaining data from an appropriate data store 126, performing data and/or voice communications, among others. Examples of data obtained from an appropriate data store 126 can include electronic mail, map data, instant messages, and voicemails, among other examples.

In the example illustrated in FIG. 1, as part of the cellular network acquisition process, the connected device 102 performed a scan of all available (e.g., in-range) cellular network connections (110, 114) being transmitted by cellular access towers (112, 116) having a range 130 within which the device is located. While only two cellular network connections and two cellular access towers are available in the example illustrated in FIG. 1, there could be any number of cellular network connections being transmitted by any number of cellular access towers at one or more frequency bands.

In addition, the connected device 102 could acquire cellular system information about additional cellular network connections that are out of range of the connected device 102. For example, cellular access towers (112, 116) within range of the connected device 102 may have information about other neighboring out-of-range cell towers and transmit that information to connected device 102 as part of the cellular network acquisition process. As a result, in an embodiment, connected device 102 may have cellular system information about cellular networks that connected device 102 cannot connect to itself based on its current location. In the example of FIG. 1, a third cellular access tower 140 is broadcasting a cellular network connection 142 having a range 144 that does not include the connected device 102. In an embodiment, the cellular access towers (112, 116, 140) of FIG. 1 are connected via a network 122, for example in the case of a particular cellular carrier, and each cellular access tower (112, 116, 140) can communicate, acquire and maintain cellular system information about every other cellular access tower connected to the network 122, which can be obtained by connected device 102 over the network 122. In another embodiment, a server-based approach may be utilized wherein one or more servers (not shown in FIG. 1) connected to the network 122 receive cellular system information associated with some or all cellular access towers connected to the network 122, for example from the cellular access towers or from devices connected to the network 122, such as by cellular network connections broadcast by the cellular access towers. Once connected device 102 connects to a network that has access to the server(s) containing the cellular access information (e.g., over the Internet), then the connected device can download the cellular system information.

The other computing device 106 is not connected to a cellular network connection, having been in "airplane mode," which is commonly understood to be a device mode in which all cellular radios are turned off. In this example, the non-connected device 106 is exiting airplane mode and once the cellular radios in the device are powered on, will initiate the cellular network acquisition process as described above with regard to connected device 102. Generally, when a computing device is attempting to make contact with a cellular network after network communications of the device are activated (e.g., when the device is powered on, airplane mode turned off, device coming back from a no service area, etc.), the device typically searches all available cellular network connections and frequency bands, which can cause battery drain and delays in acquiring service. Such a comprehensive search can be processor intensive and can drain the device's battery, and further can delay acquiring service. In some situations, such network use can cause the device to power off due to insufficient battery life, while in other instances, the network use can drain the battery such that the device operates in a low power mode, where processing power is decreased to conserve battery life.

As a result of the connected device 102 engaging in the cellular network acquisition process as described above, the connected device 102 obtains, and in a some embodiments stores, cellular system information describing the available cellular network connections (110, 114). The connected device 102 uses this cellular system information to select the cellular network connection 110 to which the connected device 102 is currently connected in the example of FIG. 1. For example, the cellular system information retrieved by the connected device 102 from the cellular access towers (112, 116) (such as in a system information block) can include parameters describing the available cellular network connections, such as a Public Land Mobile Network (PLMN) code, a frequency band, the strength of the connection signal, the cell bandwidth allocated to the connection (e.g., the maximum throughput available on the connection, which could be measured in an amount of data transmitted per second, an identification of the wireless technology type (e.g., LTE, WCDMA, GSM, CDMA), a cell congestion level of the connection (e.g., the load on the connection, which could be measured in a value corresponding to a ratio of maximum throughput versus current throughput, a numerical value on a scale representing the current load on a particular frequency band utilized in the connection, or a percentage level, such as where 100% indicates no resource available in the cell), a quality of service (QoS) associated with the connection (e.g., a value representing the stability of the connection, which could be evaluated based on the number of dropped connections to the number of total connections, and/or a network-provided or measured QoS that includes parameters such as maximum bit rate for uplink/downlink, guaranteed bit rate for uplink/downlink, and average throughput), a maximum bit rate, among others. By comparing these parameters for each available cellular network connection, the connected device 102 is able to select a connection that is not only compatible with the type of wireless technology for which the connected device 102 is configured to use, but also offers advantages such as being the strongest connection, the least congested connection, offering the highest quality of service, offering the greatest bandwidth, etc.

In the example of FIG. 1, because the non-connected device 106 is just exiting airplane mode and the cellular radio has not yet activated, the device 106 does not have any information about which cellular network connections (110, 114) are offered by cellular access towers (112, 116) having a range 130 within which the non-connected device 106 is located. In an example, this range can be a geographic region in the vicinity of the non-connected device 106. Usually, the non-connected device 106 will engage in the cellular network acquisition process as described above (i.e., scanning for all cellular network connections within range); however, as described above, this carries disadvantages relating to, among other areas, battery life and connection delay. It would be advantageous and improve the functioning of the non-connected device 106 if the cellular system information already acquired by the connected device 102 were to be transmitted to the non-connected device 106.

According to an embodiment, the cellular network acquisition process (i.e., activating cellular communications) that a device engages in when the network communications of the device are activated (e.g., turning on the device, coming out of airplane mode, etc.) may be prevented until the device performs a search for other devices (e.g., another cellphone, a central device, cellular or non-cellular, a network-accessible server, etc.) capable of transmitting cellular system information or an offer to transmit cellular system information. In the embodiment, until the device performs a search for at least one other device broadcasting cellular system information (or an offer to transmit cellular system information), the device is prevented from connecting to a cellular network connection (e.g., camping on a cellular access tower offering a cellular network connection). This behavior may in one example be configured by a user interface setting.

In the example of FIG. 1, the devices (102, 106) offer Bluetooth radio capabilities. While the example of FIG. 1 will be described further with regard to Bluetooth connections, additional and/or alternative methods of wireless connectivity may be utilized with the approaches described herein, such as Wi-Fi, Near Field Communications (NFC), infrared (IR), and Ultra Wideband, among others. According to an embodiment, the available cellular network connections correspond to a different network protocol than the connection between the connected device and the non-connected device, or in an alternate embodiment, any connection between devices utilized for implementing the approaches described herein. The connected device 102 has its Bluetooth radio activated and is broadcasting a signal 140 that can be detected by other active Bluetooth devices. In accordance with an embodiment, once the cellular radio of the non-connected device 106 becomes active, such as the non-connected device 106 coming out of airplane mode or powering on, the non-connected device 106 initiates a scan for all nearby devices broadcasting a Bluetooth signal.

Upon detecting the signal being broadcast from the connected device 102, the non-connected device 106 initiates a Bluetooth pairing process with the connected device 102. In an embodiment, the connected device 102 may provide information assisting a user of the non-connected device 106 to identify the correct device with which to pair in order to receive the cellular system information; for example, through an identifier associated with the connected device 102 that is displayed at the non-connected device 106 as part of the discovery process.

As part of the Bluetooth pairing process, the non-connected device 106 can send a service discovery request to the connected device 102, for example using the Bluetooth Service Discovery Protocol (SDP). In response, the connected device 102 can notify the non-connected device 106 that it supports transmitting cellular system information over a paired Bluetooth connection. For example, by using a Bluetooth profile that enables the devices (102, 106) to exchange and read the cellular system information. In an embodiment, the Bluetooth profile allows the devices (102, 106) to exchange one or more lists of parameters associated with each of the cellular network connections described by the cellular system information. For example, the Bluetooth profile may describe one or more data fields and a number of bits associated with each field, such as: a field name of "PLMN ID" that has 25 bits of data associated with it; a field name of "Frequency Band" that has 6 bits of data associated with it; a field name of "Cell Bandwidth" that has 6 bits of data associated with it; and so on. Because both devices (102, 106) support the example Bluetooth profile, each device can read and utilize the cellular system information and the parameters contained within. In an embodiment, the example Bluetooth profile may be modified to contain any number of fields describing various parameters or other information.

According to an embodiment, each available cellular network connection and frequency band for which the connected device 102 has stored cellular system information will have a set of parameters described by the example Bluetooth profile. As an example, a device may identify ten available cellular network connections and store cellular system information describing each of the ten connections. This would result in ten sets of parameters, such as those described above, each set of parameters describing one of the ten connections.

In the example of FIG. 1, the non-connected device 106 receives the cellular system information described according to the example Bluetooth profile supported by the devices (102, 106). The cellular system information describes the available cellular network connections (110, 114) that the connected device 102 detected during a previous scan. For example, these are cellular network connections available in the geographic region in which the non-connected device 106 is located.

Once the non-connected device 106 receives the cellular system information, it selects one of the available cellular network connections described by the cellular system information. For example, the selection may be based on the cellular system information. This may be accomplished by comparing the parameters described by the cellular system information and associated with each available cellular network connection, By comparing the parameters for each available connection, the non-connected device 106 is able to select a connection that is not only compatible with the type of radio access or wireless technology for which the non-connected device 106 is configured to use, but also offers advantages such as being the fastest and/or strongest connection, the least congested connection, offering the highest quality of service, offering the greatest bandwidth, etc. Once a selection is made, then the non-connected device 106 connects to the selected cellular network connection.

According to an embodiment, the devices (102, 106) may utilize a Bluetooth profile to transfer cellular system information that defines a client role and a server role. In the example of FIG. 1, connected device 102 would assume the server role because connected device 102 is broadcasting the cellular system information for available cellular network connections. The non-connected device 106 would assume the client role because non-connected device 106 is interested in receiving the cellular system information for the available cellular network connections. In an example embodiment, the server process executing on connected device 102 would be executing an instance of a service that would broadcast the cellular system information to all interested clients; e.g., a list of parameters associated with each available cellular network connection described by the cellular system information. In an embodiment, a device may implement a client and a server substantially simultaneously, for example to support multi-hop broadcasting of the cellular system information.

Accordingly, in accordance with various embodiments, approaches enable a computing device to detect a Bluetooth radio broadcast from another device, and establish a paired Bluetooth connection between the devices. A Bluetooth service discovery request sent from the computing device results in the device receiving cellular system information, for example, information describing cellular network connections available in the geographic region where the device is located. The cellular system information can be described according to a Bluetooth profile supported by the paired Bluetooth devices. The computing device can then select between compatible available cellular network connections based on the cellular system information, and then connect to the selected cellular network connection.

Figure 2:
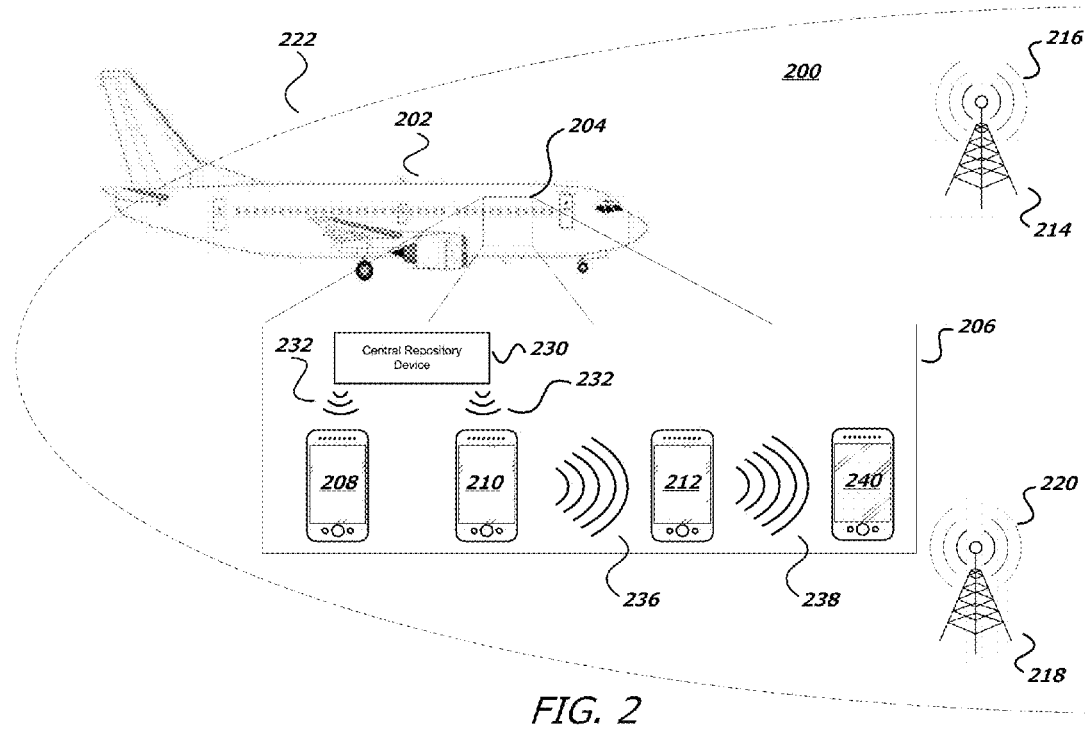
FIG. 2 illustrates an example of a centralized repository device transmitting cellular system information, over a connection with multiple computing devices, used by the computing devices in selecting and connecting to an available cellular network, in accordance with various embodiments.

FIG. 2 illustrates an example of a centralized repository device transmitting, over a connection with multiple computing devices, cellular system information used by the computing devices in selecting and connecting to an available cellular network, in accordance with various embodiments. As shown in the example situation 200 of FIG. 2, an airplane 202 has landed at its destination with multiple passengers on board. A subset 204 of the passengers is represented by the cutaway portion 206 of FIG. 2, each of the subset of passengers possessing a cellular device 208-212, two of the cellular devices 208, 210 coming out of airplane mode and a third cellular device 212 powering on. The airplane contains one or more central repository devices 230.

In the example illustrated in FIG. 2, the central repository device 230 performs a scan of all available cellular network connections (216, 220) being transmitted by cellular access towers (214, 218) having a range 222 within which the central repository device 230 and/or a cellular device is located. For example, the central repository device 230 obtains, and in some embodiments stores, cellular system information describing the available cellular network connections (216, 220). While only two cellular network connections and two cellular access towers are present in the example illustrated in FIG. 2, there could be any number of cellular network connections being transmitted by any number of cellular access towers at one or more frequency bands.

As two of the cellular devices 208, 210 come out of airplane mode, a connection 232 is established between the cellular devices 208, 210 and the central repository device 230. For example, the connection could be a Bluetooth pairing connection as described with regard to the examples of FIG. 1, above, or a different wireless connectivity approach, such as Wi-Fi, Near Field Communications (NFC), infrared (IR), or Ultra Wideband, among others. Once the connection 232 between the devices is established, the cellular devices 208, 210 send a request for cellular system information to the central repository device 230. The central repository device 230, having performed a scan of all available cellular network connections (216, 220), accesses the stored cellular system information retrieved from, for example, the cellular access towers (214, 218) as part of a system information block. According to an embodiment, this cellular system information describes the available cellular network connections detected by the central repository device 230 and in one example being available in the geographic area in which the cellular devices 208, 210 are located.

In the example of FIG. 2, the cellular devices 208, 210 receive the cellular system information from the central repository device 230 over the connection 232, and the cellular devices 208, 210 use the cellular system information to determine which of the available cellular network connections should be selected for connection. For example, each of the cellular devices 208, 210 read a set of parameters from the cellular system information, each of the set of parameters being associated with one of the available cellular network connections and describing aspects of the connection. For example, the parameters may represent characteristics or values of the available cellular network connections, such as a Public Land Mobile Network (PLMN) code, a frequency band, the bandwidth allocated to the connection, an identification of the radio access or wireless technology (e.g., LTE, WCDMA, GSM, CDMA), a congestion level of the connection, a quality of service associated with the connection, a maximum bit rate, among others. By comparing these parameters for each available cellular network connection, the cellular devices 208, 210 are able to select a connection that is not only compatible with the type of radio access or wireless technology for which each of the cellular devices 208, 210 is configured to use, but also offers advantages such as being the fastest/strongest connection, the least congested connection, offering the highest quality of service, offering the greatest bandwidth, etc.

In the example of FIG. 2, the third cellular device 212 is powering on, and because this process can take longer than coming out of airplane mode, the third cellular device 212 is not ready to connect to an available cellular network connection until after the other two cellular devices 208, 210 have acquired the cellular system information and connected to a cellular network connection. According to an embodiment, the third cellular device 212 can establish a peer-to-peer connection with one of the other two cellular devices 208, 210 to obtain the cellular system information, as described with regard to the examples of FIG. 1, or may connect to the central repository device 230 as described herein. In an embodiment, the third cellular device 212 may form a connection with a fourth cellular device 240 that may be out-of-range of the first and second cellular devices (208, 210) and the central repository device 230, for example over an ad-hoc network 238 such as a Wi-Fi connection between the devices. Using this connection 238, the fourth cellular device 240 may obtain the cellular system information from the third cellular device 212. Using this technique, any number of nodes may be part of a multi-hop data transfer to obtain the cellular system information.

According to an embodiment, one or both of the cellular devices 208, 210 that received cellular system information from the central repository device 230, and as a result connected to an available cellular network connection, may store the cellular system information and camp on the cellular access tower offering the cellular network connection to which they are connected. Once the device is connected to the cellular access tower, it may receive current cellular system information from the cellular access tower, for example parameters associated with the cellular network connection, as part of a system information block. Once the device receives the current cellular system information based on its actual connection to the cellular network, rather than the cellular system information received from the central repository device 230, the cellular device may update its stored cellular system information with the current cellular system information, for example received from the cellular access tower or determined by analyzing data transmitted to the cellular device over the cellular network connection. In an embodiment, the cellular device updates one or more parameters of the stored cellular system information with the current parameters received as part of the current cellular system information, or with parameters measured by the cellular device based on its cellular network connection. For example, a cellular device may receive parameters representing the bandwidth and the cell congestion level of a particular cellular network connection. Once the cellular device connects to the particular cellular network connection, the device may receive updated parameters representing the bandwidth and the cell congestion level of the cellular network connection, for example from the cellular access tower, or may independently measure the bandwidth and cell congestion level of its cellular network connection. In either case, the cellular device may update the stored cellular system information with the updated information. In an embodiment, the cellular device may store multiple sets of cellular system information, any of which may be updated over time. In the case of one of the cellular devices transmitting cellular system information over a peer-to-peer network to another cellular device, such as the examples described with regard to FIG. 1, then the cellular device may transmit the updated cellular system information rather than the cellular system information originally received from another cellular device or a central repository device, or a combination of different cellular system information sets. According to an embodiment, rather than rely upon establishing a connection to each individual cellular device, the central repository device 230 may broadcast the cellular system information, for example over a wi-fi connection already existing throughout the airplane 202.

While the example illustrated in FIG. 2 relates to the airplane 202 having landed, the approaches described herein could also be utilized while the airplane 202 is in the air. For example, rather than the central repository device 230 receiving cellular system information from cellular access towers in the geographic vicinity of the airplane, a component of the airplane, for example an antenna or one or more central repository devices, could receive cellular system information for any given geographical area, for example from a satellite. The cellular system information could be communicated to one or more central repository devices and made available to passengers' cellular devices, for example upon landing when cellular devices are usually taken out of airplane mode and/or powered up. Using this approach, a plane traveling to, for example, San Francisco, could receive cellular system information for the geographic area around the airport near San Francisco, in San Francisco, or in the entire Bay Area while flying over Las Vegas.

According to an embodiment, cellular system information for a geographic area may be utilized to proactively download important data in the event that the cellular system information indicates the presence of one or more "dead zones," or areas with zero to poor cellular network coverage, or areas that do not offer a cellular network connection compatible with a particular device. A cellular device could receive such cellular system information for a geographic area and use it to identify dead zones or areas exclusively served by incompatible cellular network connections. For example, such additional cellular system information could be obtained for at least one cellular network connection not available in the current geographic area in which the cellular device is located. Based on the additional cellular system information, the cellular device could determine that some portion of an adjacent or separate geographic area to the cellular device lacks an available cellular network connection, for example because no compatible connections are available, or because cell towers are down, etc. In one embodiment, the cellular device could compare known or possible travel routes that may be taken with the cellular system information for the geographic area around the travel routes. Upon detecting that a dead zone lies along the travel route, proactive measures may be implemented. For example, a predetermined set of data may be automatically downloaded while the cellular device has a stable network connection. This predetermined set of data could include, for example, map data, e-mail data, voicemails, instant messages, web pages, multimedia data such as audio/video data, and so forth.

While the examples described herein with regard to FIG. 2 have been described in the context of an airplane, the disclosed techniques are not limited to any one type of conveyance or any specific location. The disclosed techniques may be used in additional environments, such as a train, a boat, or any type of transit device, in transit or at rest. Other examples include airports, train stations, shopping malls, open-air plazas, or any location where cellular system information could be obtained and transmitted to cellular devices, either by one or more central repository devices or in a peer-to-peer context, or a combination of both. In one example, an airport may have numerous central repository devices arranged throughout its interior to broadcast cellular system information.

Figure 3:
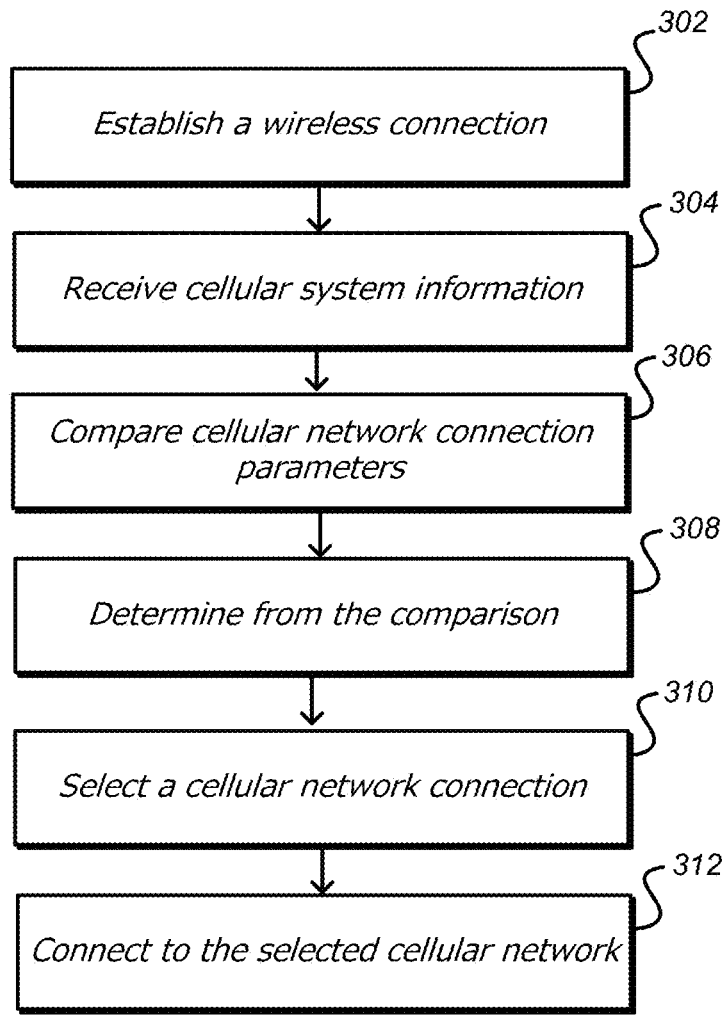
FIG. 3 illustrates an example process for sharing cellular system information in accordance with various embodiments.

FIG. 3 illustrates an example process for sharing cellular system information in accordance with various embodiments. It should be understood that, for any process discussed herein, there can be additional, fewer, or alternative steps performed in similar or alternative orders, or in parallel, within the scope of the various embodiments unless otherwise stated. In accordance with various embodiments, a device can be configured to receive cellular system information over a Bluetooth connection with another device for selecting an available cellular network connection the device can connect to.

For example, a cellular-enabled device such as a cellphone establishes a wireless connection to another device. In an embodiment, one of the devices is connected to a cellular network and the other device is not connected to a cellular network. For example, one device may be a cellphone that is active and connected to a cellular network, while the other device may be a cellphone that is not connected to a cellular network; for example, just starting to come out of airplane mode. In another example, the available cellular network connections correspond to a first network communication protocol (e.g., LTE, 3G, cellular connections) and the connection between the first device and the second device uses another network communication protocol that is different from the first network communication protocol (e.g., Bluetooth, Wi-Fi, NFC, etc.). In an embodiment of a connection between two Bluetooth-enabled devices, a device can be configured to detect a Bluetooth radio broadcast from another device, for example another Bluetooth-enabled device that is in discoverable mode and actively soliciting Bluetooth connections. Once the cellular-enabled device detects the Bluetooth broadcast, it establishes a paired Bluetooth connection with the other device, for example by utilizing Bluetooth techniques known in the art for pairing two devices for communication over the Bluetooth protocol. After the devices are paired, the cellular-enabled device may send a Bluetooth Service Discovery Request to the paired device, for example by utilizing the Bluetooth Service Discovery Protocol. This allows the cellular-enabled device to discover services available on the paired device. According to an embodiment, the paired device is executing a service to provide cellular system information to the cellular-enabled device over the paired connection. In one example, this service is a System Acquisition Service that operates to broadcast cellular system information to paired devices.

The cellular-enabled device receives 304 the cellular system information from the paired device over the wireless connection. For example, the cellular system information describes one or more available cellular network connections that are being transmitted in the same geographic region as the cellular-enabled device.

According to an embodiment, the cellular system information contains one or more sets of parameters, each set of parameters being associated with an available cellular connection and describing aspects of the available cellular connection; e.g., PLMN code, radio access technology type, frequency band, bandwidth, quality of service, congestion level, etc. In an embodiment, the cellular system information is stored and transmitted between the devices in a format that is compatible with, or understandable by, both devices. In the Bluetooth example described above, according to an embodiment, the cellular system information is described according to a Bluetooth profile supported by the cellular-enabled device and the paired device. For example, the Bluetooth profile is a specification regarding an aspect of Bluetooth-based wireless communication between devices, and allows the cellular-enabled device and the paired device to exchange the cellular system information in a format that is understood by both devices.

The parameters of the available cellular network connections are then compared 306, and a determination 308 is made as to which available cellular network connection is preferable; for example, the fastest, or the least congested, or the most stable, or the "best available" according to a combination of factors. This is accomplished by, for example, evaluating and comparing the parameters in the cellular system information for each available cellular network connection to determine which cellular network connection is the optimal selection. This may include selecting the cellular network connection and frequency band with the highest bandwidth, or the lowest congestion. In an embodiment, the cellular-enabled device only selects a cellular network connection (i.e., radio access technology type) that it is configured to use; e.g., a 3G device would not select a LTE network. In an embodiment, the device can determine the priority of the parameters utilized in the determination. For example, if a device is simply going to camp on a cell and be idle, then the device may only look to choose a connection that is compatible regardless of any other parameter values. In another example, if a device is going to perform data-intensive operations (e.g., downloading data), the device may prioritize a cellular network connection that is compatible with the device, has the least congestion, has the best Quality of Service, has the greatest bandwidth, etc. The use of the parameters is not limited to a particular example; rather, one or more parameters may be analyzed in the determination, in any order. The parameters may be compared in a stepwise order, for example the "higher-prioritized" parameters being determinative, or an averaging-type approach could be utilized to create an overall "score" for each available cellular network connection based on one or more parameters, and then the scores could be compared to decide which connection is preferable. Those skilled in the art will understand that any number of techniques involving comparing network parameters may be utilized to determine a "best" cellular connection.

Based on the cellular system information, the cellular-enabled device selects 310 one of the available cellular network connections described in the cellular system information. Once the cellular-enabled device selects the cellular network connection, it connects 312 to the selected cellular network connection.

Figure 4:
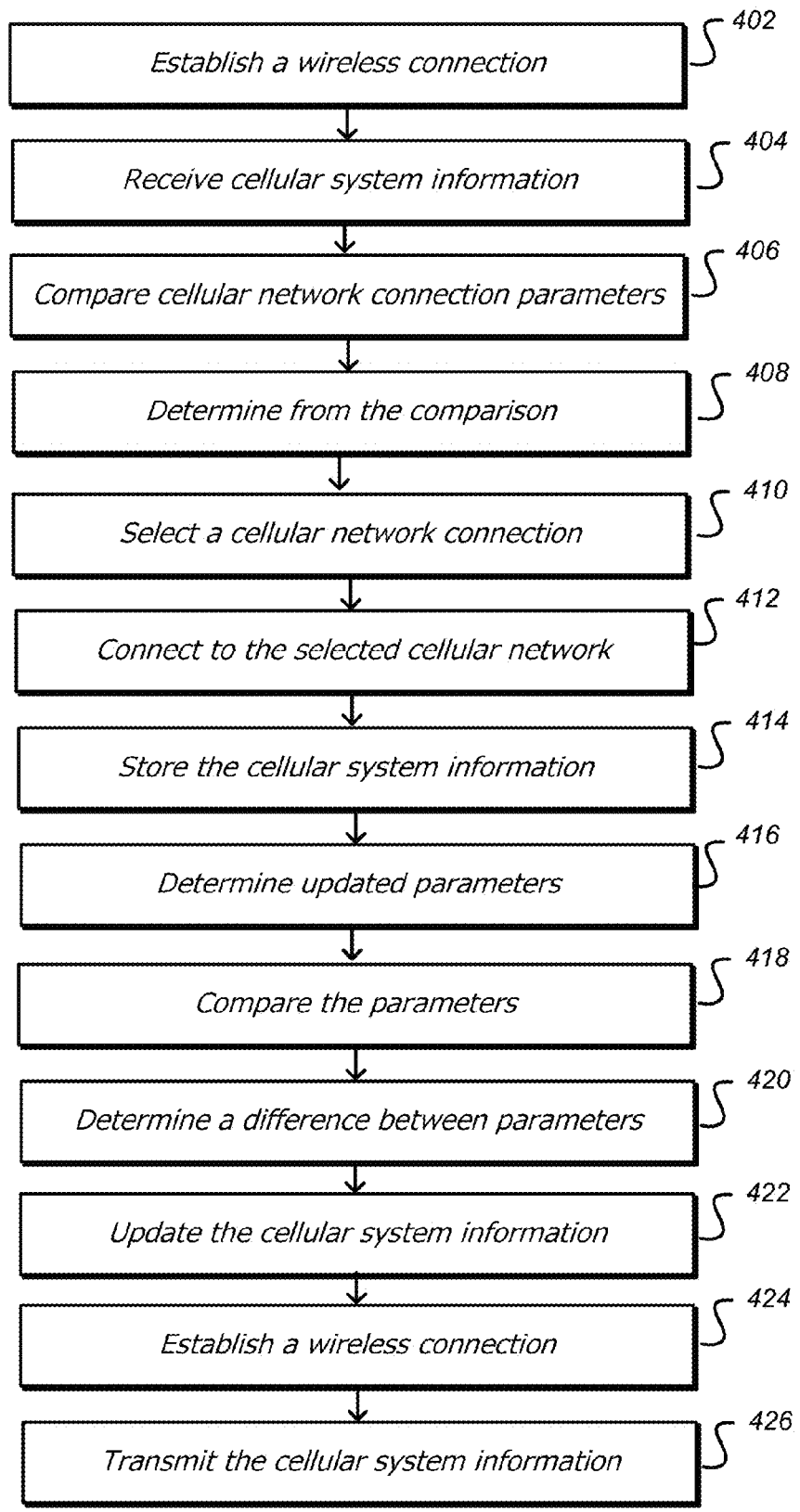
FIG. 4 illustrates an example process for sharing cellular system information in accordance with an alternate embodiments.

FIG. 4 illustrates an example process for sharing cellular system information in accordance with various alternate embodiments. As described, a connection is established between two devices, after which in one embodiment, a request for cellular system information is sent by one of the devices, in response to which the cellular system information is received by the requesting device. The receiving device selects an available cellular network connection and connects to it. For example, two cellular-enabled devices, or one cellular-enabled device and one non-cellular enabled device may establish 402 a connection. The connection may be using any one of numerous technologies; e.g., Bluetooth, Wi-Fi, NFC, etc. In an embodiment, one of the devices is connected to a cellular network and the other device is not connected to a cellular network. A device receives 404 cellular system information, for example over a non-cellular connection between the two devices. According to an embodiment, the cellular system information contains one or more sets of parameters, each set of parameters being associated with an available cellular connection and describing aspects of the available cellular connection; e.g., PLMN code, radio access technology type, frequency band, bandwidth, quality of service, congestion level, etc. The parameters may then be compared 406, and a preferable (e.g., faster) cellular connection determined 408, as in the examples described above. The receiving device then uses the determination and the cellular system information to select 410 one of the available cellular network connections described by the cellular system information. This is accomplished by, for example, evaluating and comparing the parameters in the cellular system information for each available cellular network connection to determine which cellular network connection is the optimal selection. This may include selecting the cellular network connection and frequency band with the highest bandwidth, or the lowest congestion. In an embodiment, the requesting device only selects a radio access technology type that it is configured to use; e.g., a 3G device would not select a LTE network. Once the receiving device selects the cellular network connection, it connects 412 to the selected cellular network connection.

According to an embodiment, the receiving device stores 414 the cellular system information received from the other device, for example in non-volatile storage communicatively coupled to the receiving device. The receiving device then determines updated parameters 416 of the cellular connection to which it is connected. For example, the receiving device may analyze data transmitted over the cellular connection, for example to determine characteristics of the connection such as bandwidth, congestion level, quality of service, etc. The receiving device may also receive updated parameters from other sources; for example, one or more cell towers associated with the connected cellular connection. The receiving device may then compare 418 the updated parameters to the original parameters received from the other device, or to another set of parameters, for example an older set of parameters determined by analyzing data as described above. The receiving device may determine from the comparison 420 that there is a difference between at least one of the original parameters (or in another example, an older set of parameters) and the updated parameters.

The receiving device may then update 422 its stored parameters, for example with the updated parameters. In one example, additional data fields could be associated with each parameters, the fields storing different versions of the parameter values. For example, an additional QoS field could be created, in which a real-time QoS value could be stored. The receiving device then establishes 424 a connection between the receiving device and another device, for example over a peer-to-peer connection. In an embodiment, the receiving device is connected to a cellular network and the other device is not connected to a cellular network. Once the connection is established, the receiving device transmits 426 the cellular system information originally received from another device, or the updated cellular system information, or multiple sets of cellular system information, to the other device.

Figure 5:
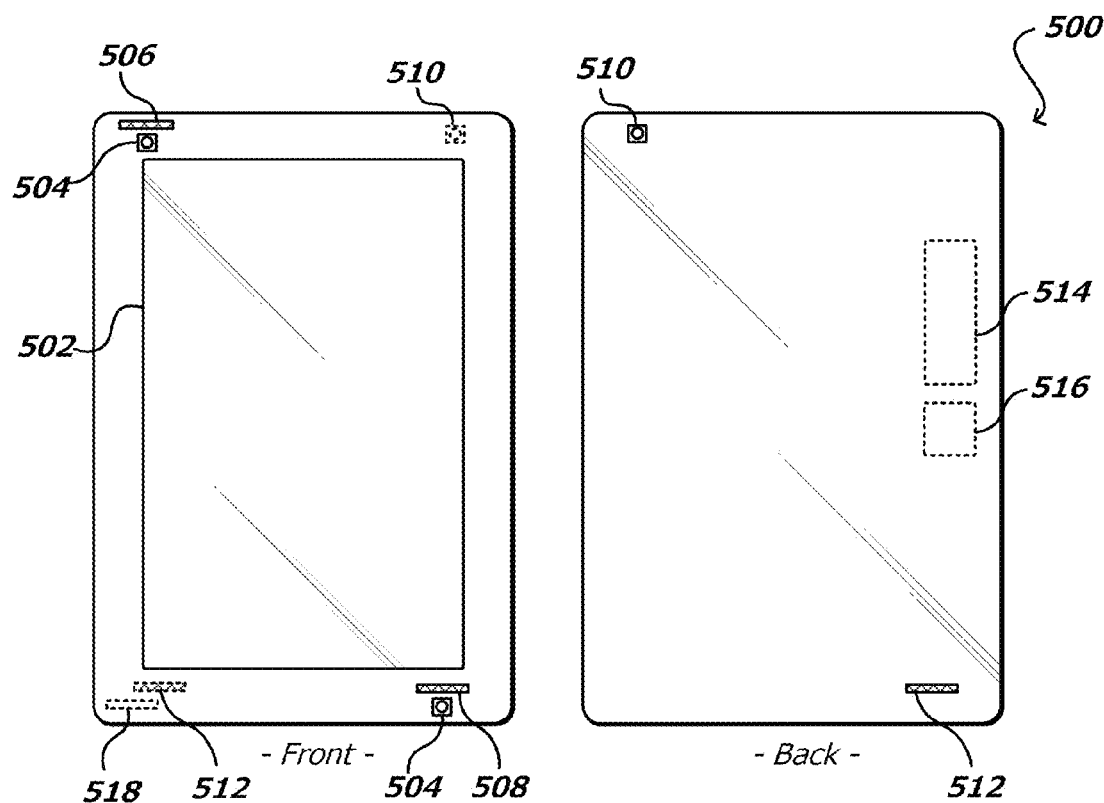
FIG. 5 illustrates front and back views of an example portable computing device that can be used in accordance with various embodiments.

FIG. 5 illustrates front and back views of an example electronic computing device 500 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 500 has a display screen 502 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 504 on the front of the device and at least one image capture element 510 on the back of the device. It should be understood, however, that image capture elements could also, or alternatively, be placed on the sides or corners of the device, and that there can be any appropriate number of capture elements of similar or different types. Each image capture element 504 and 510 may be, for example, a camera, a charge-coupled device (CCD), a motion detection sensor or an infrared sensor, or other image capturing technology.

As discussed, the device can use the images (e.g., still or video) captured from the imaging elements 504 and 510 to generate a three-dimensional simulation of the surrounding environment (e.g., a virtual reality of the surrounding environment for display on the display element of the device). Further, the device can utilize outputs from at least one of the image capture elements 504 and 510 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 508 on the front side, one microphone 512 on the back, and one microphone 506 on or near a top or side of the device. In some devices there may be only one microphone, while in other devices there might be at least one microphone on each side and/or corner of the device, or in other appropriate locations.

The device 500 in this example also includes one or more orientation- or position-determining elements 518 operable to provide information such as a position, direction, motion, or orientation of the device. These elements can include, for example, accelerometers, inertial sensors, electronic gyroscopes, and electronic compasses.

The example device also includes at least one communication mechanism 514, such as may include at least one wired or wireless component operable to communicate with one or more electronic devices. The device also includes a power system 516, such as may include a battery operable to be recharged through conventional plug-in approaches, or through other approaches such as capacitive charging through proximity with a power mat or other such device. Various other elements and/or combinations are possible as well within the scope of various embodiments.

Figure 6:
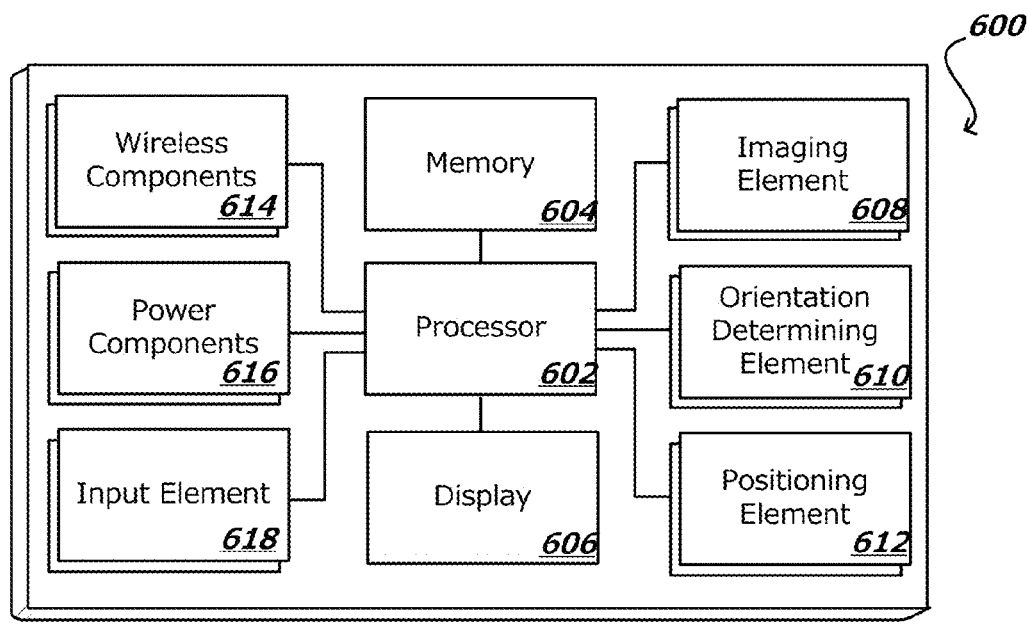
FIG. 6 illustrates an example set of basic components of a portable computing device, such as the device described with respect to FIG. 5.

FIG. 6 illustrates a set of basic components of an electronic computing device 600 such as the device 500 described with respect to FIG. 5. In this example, the device includes at least one processing unit 602 for executing instructions that can be stored in a memory device or element 604. As would be apparent to one of ordinary skill in the art, the device can include many types of memory, data storage, or computer-readable media, such as a first data storage for program instructions for execution by the processing unit(s) 602, the same or separate storage can be used for images or data, a removable memory can be available for sharing information with other devices, and any number of communication approaches can be available for sharing with other devices.

The device typically will include some type of display element 606, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 608, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 600 also includes at least one orientation determining element 610 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 600. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 612 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 614 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 616, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 618 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 7:
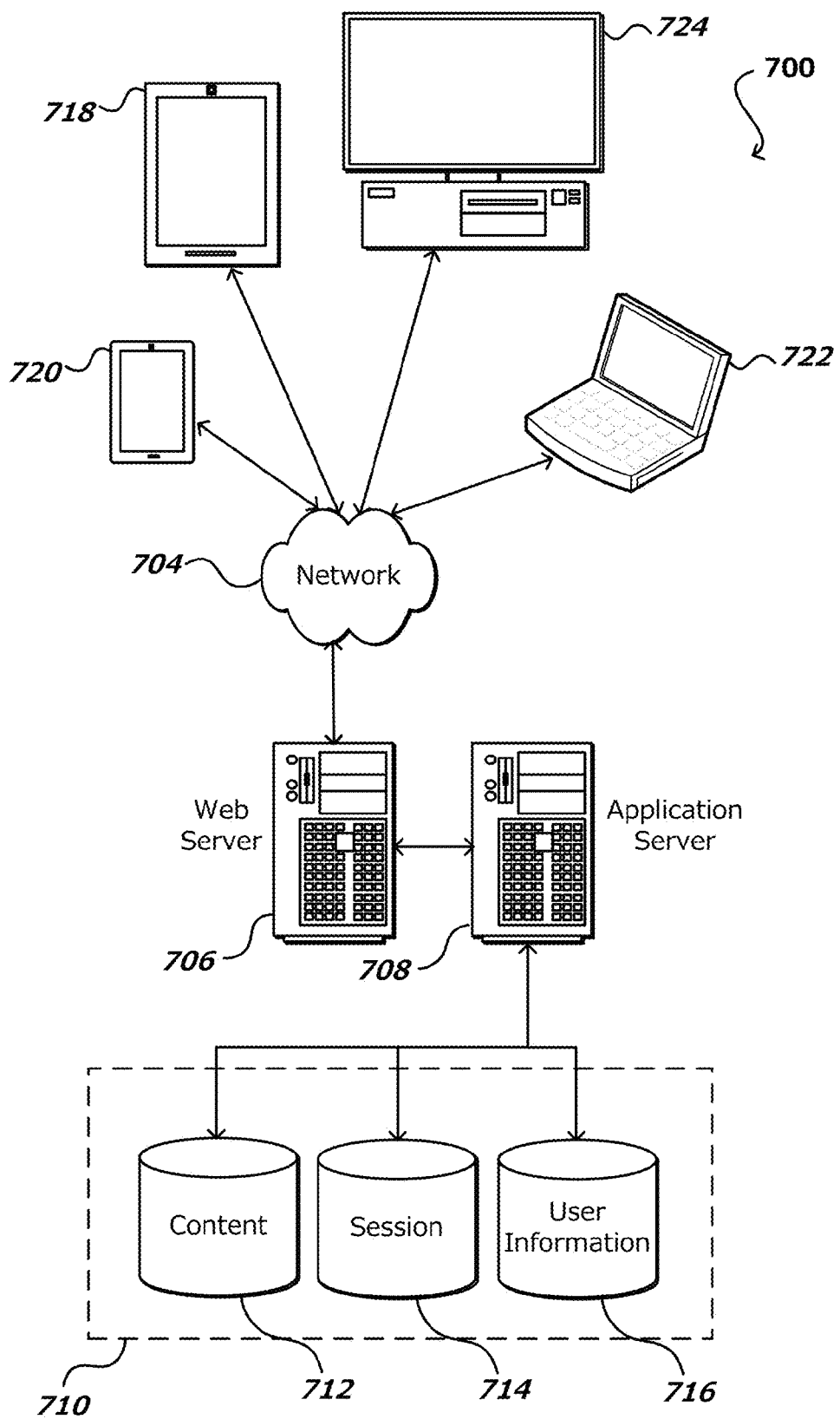
FIG. 7 illustrates an example of an environment for implementing aspects in accordance with various embodiments.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes electronic client devices 718, 720, 722, and 724, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks, an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 708 can include any appropriate hardware and software for integrating with the data store 710 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 706 in the form of HTML, XML or another appropriate structured language in this example. The handling of all requests and responses, as well as the delivery of content between the client devices 718, 720, 722, and 724 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing content (e.g., production data) 712 and user information 716, which can be used to serve content for the production side. The data store is also shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 718, 720, 722 and 724. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method, comprising:
   establishing a wireless connection between a first device and a second device, wherein at a time the connection is established, the first device is not connected to a cellular network and the second device is connected to a cellular network;

receiving, by the first device from the second device over the wireless connection, cellular system information comprising a first set of parameters describing characteristics of (a) a first cellular network connection that is available in a geographic region in which the first device is located and (b) a second cellular network connection that is available in the geographic region, wherein the parameters comprise values related to radio access technology type, cell congestion level, and quality of service, and the cellular system information is transmitted over the wireless connection in a format compatible with the first device and the second device;

comparing, by the first device, the values related to the radio access technology type, cell congestion level, and quality of service of the first and second cellular network connections in the first set of parameters;

determining, by the first device, from comparing of the values related to radio access technology type that the first cellular network connection is compatible with the first device;

determining, by the first device, from comparing of the values related to cell congestion level and quality of service that the first cellular network connection is less congested with a higher quality of service than the second cellular network connection;

selecting, by the first device, the first cellular network connection; and connecting, by the first device, to a cellular tower providing the first cellular network connection.

2. The computer implemented method of claim 1, further comprising:

storing, at the first device, the cellular system information including the first set of parameters received from the second device;

determining, by the first device, a second set of parameters associated with the first cellular network connection by analyzing data transmitted to the first device over the first cellular network connection;

comparing, by the first device, the second set of parameters to the first set of parameters;

determining, by the first device, from the comparison that at least one of the second set of parameters of the first cellular network connection is different from a corresponding at least one of the first set of parameters;

updating, by the first device, the cellular system information stored at the first device by replacing the at least one parameter determined to be different with the at least one parameter in the second set of parameters;

establishing a wireless connection between the first device and a third device, wherein at a time the connection is established, the first device is connected to the first cellular network connection and the second device is not connected to a cellular network connection; and transmitting over the wireless connection between the first device and the third device, the updated cellular system information.

3. The computer implemented method of claim 1, further comprising:

determining, by the first device, from the cellular system information, parameter values associated with the first cellular connection and the second cellular connection, the parameter values related to radio access technology type and at least one of cell bandwidth, cell congestion level, or quality of service;

determining, by the first device, from the radio access technology type parameter value, that the first cellular connection is compatible with the first device and the second cellular connection is not compatible with the first device; and determining that the first cellular network connection should be selected by the first device.

4. The computer implemented method of claim 1, further comprising:

determining, by the first device, from the cellular system information, parameter values associated with the first cellular connection and the second cellular connection, the parameter values related to radio access technology type and at least one of cell bandwidth, cell congestion level, or quality of service;

determining, by the first device, from the radio access technology type parameter value, that the first cellular connection and the second cellular connection are compatible with the first device;

comparing, by the first device, parameter values related to the at least one of cell bandwidth, cell congestion level, or quality of service;

determining, by the first device, from the comparison that the first cellular network connection communicates data faster than the second cellular network connection; and selecting, by the first device, the first cellular network connection.

5. A computer implemented method, comprising:

establishing, by a first device, a connection between the first device and a second device;

sending, by the first device to the second device, a request for cellular system information for a plurality of cellular network connections available in a geographic area in which the first device is located;

receiving, by the first device, the cellular system information;

selecting, by the first device, a first cellular network connection of the plurality of cellular network connections based on the cellular system information; and connecting, by the first device, to the first cellular network connection.

6. The computer implemented method of claim 5, further comprising:

storing, at the first device, the cellular system information received from the second device;

determining, from the cellular system information received from the second device, parameters associated with the first cellular network connection;

determining, by the first device at a predetermined frequency, updated parameters for the first cellular network connection by analyzing data transmitted to the first device over the first cellular network connection; and updating, at the first device, the stored cellular system information associated with the first cellular network connection based on the updated parameters.

7. The computer implemented method of claim 5, further comprising:

storing, at the first device, the cellular system information received from the second device;

detecting, by the first device, a connection request from a third device;

establishing a connection with the third device; and transmitting, by the first device to the third device, the cellular system information.

8. The computer implemented method of claim 5, wherein the selecting further comprises:
    determining, from the cellular system information, parameters associated with each of the plurality of cellular network connections;
    comparing the parameters associated with each of the plurality of cellular network connections; and
    selecting, by the first device, one of the plurality of cellular network connections.

9. The computer implemented method of claim 8, wherein the parameters associated with each of the plurality of cellular network connections includes at least one of cell bandwidth, cell congestion level, or quality of service.

10. The computer implemented method of claim 8, further comprising:
    storing, at the first device, the cellular system information;
    determining, by the first device, an updated value for each of the parameters associated with the first cellular network by analyzing data transmitted to the first device over the first cellular network connection;
    changing, in the cellular system information stored at the first device, each of the parameter values to the updated value.

11. The computer implemented method of claim 5, further comprising:
    activating cellular communications of the first device;
    searching, by the first device, for a device broadcasting cellular system information; and
    preventing the first device, until the search is complete, from connecting to one of the plurality of cellular network connections.

12. The computer implemented method of claim 5, further comprising:
    receiving additional cellular system information for at least one cellular network connection not available in the geographic area in which the first device is located;
    determining, by the first device, based on the additional cellular system information, that a portion of an adjacent geographic area to the first device lacks an available cellular network connection supported by the first device; and
    initiating a download of predetermined data at the first device over the first cellular network, wherein the predetermined data includes at least one of map data, electronic mail, voicemail data, multimedia data, or web pages.

13. The computer implemented method of claim 5, wherein the plurality of cellular network connections correspond to a first network communication protocol and the connection between the first device and the second device uses a second network communication protocol different from the first network communication protocol.

14. The computer-implemented method of claim 5, wherein the connection between the first device and the second device is one of a Bluetooth connection, a Wi-Fi connection, or a Near-Field Communications (NFC) connection.

15. A computing device, comprising:
    at least one processor;
    memory including instructions that, when executed by the processor, cause the computing device to:
        establish, by a first device, a connection between a first device and a second device;
        send, from the first device to the second device, a request for cellular system information describing a plurality of cellular network connections available in a geographic area in which the first device is located;
        receive the cellular system information at the first device;
        select, by the first device, a first cellular network connection of the plurality of cellular network connections based on the cellular system information; and
        connect, by the first device, to the first cellular network connection.

16. The computing device of claim 15, wherein at the time the connection is established, the first device is not connected to a cellular network and the second device is connected to a cellular network.

17. The computing device of claim 15, wherein the instructions, when executed, further cause the computing system to:
    store, at the first device, the cellular system information;
    camp, by the first device, on a cell offering the selected cellular network connection;
    receive, at the first device from the camped cell, parameters associated with the selected cellular network connection; and
    update, at the first device, the cellular system information associated with the selected cellular network connection based on the received parameters.

18. The computing device of claim 15, wherein the instructions, when executed, further cause the computing system to:
    store, at the first device, the cellular system information;
    detect, by the first device, a connection request from a third device;
    establish a connection with the third device; and
    transmit, by the first device to the third device, the cellular system information.

19. The computing device of claim 15, wherein the instructions, when executed, further cause the computing system to:
    read, from the cellular system information, parameters associated with each of the plurality of cellular network connections;
    compare the parameters associated with each of the plurality of cellular network connections; and
    select, by the first device, one of the plurality of cellular network connections.

20. The computing device of claim 15, wherein the instructions, when executed, further cause the computing system to:
    activate cellular communications of the first device;
    search, by the first device, for a non-cellular device broadcasting cellular system information; and
    prevent the first device, until the search is complete, from connecting to one of the plurality of cellular network connection.

* * * * *